United States Patent
Kosuge et al.

(10) Patent No.: US 12,266,827 B2
(45) Date of Patent: Apr. 1, 2025

(54) LITHIUM PRIMARY CELL WITH A POSITIVE ELECTRODE INCLUDING MANGANESE DIOXIDE AND A BORON COMPOUND

(71) Applicant: Panasonic Intellectual Property Management Co., Ltd., Osaka (JP)

(72) Inventors: Keiko Kosuge, Osaka (JP); Fumio Kato, Osaka (JP); Toshiyuki Shimizu, Osaka (JP); Yusuke Kawahara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 720 days.

(21) Appl. No.: 17/261,111

(22) PCT Filed: Apr. 2, 2019

(86) PCT No.: PCT/JP2019/014568
§ 371 (c)(1),
(2) Date: Jan. 18, 2021

(87) PCT Pub. No.: WO2020/021775
PCT Pub. Date: Jan. 30, 2020

(65) Prior Publication Data
US 2021/0320307 A1    Oct. 14, 2021

(30) Foreign Application Priority Data
Jul. 23, 2018    (JP) ................. 2018-137982

(51) Int. Cl.
*H01M 6/16*    (2006.01)
*H01M 4/06*    (2006.01)
*H01M 4/131*    (2010.01)
*H01M 4/134*    (2010.01)
*H01M 4/36*    (2006.01)
(Continued)

(52) U.S. Cl.
CPC ............... *H01M 6/16* (2013.01); *H01M 4/06* (2013.01); *H01M 4/131* (2013.01); *H01M 4/134* (2013.01);
(Continued)

(58) Field of Classification Search
CPC ......... H01M 10/0587; H01M 10/0431; H01M 50/107; H01M 10/0422; H01M 2004/021; H01M 4/70; H01M 6/10
See application file for complete search history.

(56) References Cited

U.S. PATENT DOCUMENTS 5,989,751 A * 11/1999 Cotte .................... H01M 4/622
429/127
6,521,373 B1 * 2/2003 Suzuki ................ H01M 10/052
429/162
(Continued)

FOREIGN PATENT DOCUMENTS

| CA | 2144107 C | * 6/1998 | .......... H01M 10/052 |
|---|---|---|---|
| JP | 08279366 A | * 10/1996 | .......... H01M 10/052 |
| JP | 2009-266736 | 11/2009 | |

OTHER PUBLICATIONS

International Search Report of PCT application No. PCT/JP2019/014568 dated Jun. 11, 2019.

*Primary Examiner* — Imran Akram
(74) *Attorney, Agent, or Firm* — Rimon P.C.

(57) ABSTRACT

A lithium primary cell includes an electrode group and a non-aqueous electrolytic solution. The electrode group includes a positive electrode, a negative electrode, and a separator, in which the positive electrode and the negative electrode are wound with the separator interposed therebetween. In the electrode group, an area where the positive electrode and the negative electrode face each other is 250 cm$^2$ or more and 350 cm$^2$ or less. The positive electrode includes a positive electrode mixture including manganese (Continued)

dioxide and a boron compound. The negative electrode includes lithium metal or a lithium alloy. The non-aqueous electrolytic solution includes ethylene carbonate. A content of the boron compound in the positive electrode is 0.5 parts by mass or more and 2 parts by mass or less in terms of boron with respect to 100 parts by mass of the positive electrode mixture. A content of the ethylene carbonate in the non-aqueous electrolytic solution is 1 part by mass or more and 10 parts by mass or less with respect to 100 parts by mass of the manganese dioxide.

6 Claims, 2 Drawing Sheets

(51) Int. Cl.
*H01M 4/40* (2006.01)
*H01M 4/505* (2010.01)
*H01M 50/107* (2021.01)

(52) U.S. Cl.
CPC ........... *H01M 4/364* (2013.01); *H01M 4/405* (2013.01); *H01M 4/505* (2013.01); *H01M 50/107* (2021.01); *H01M 2300/0037* (2013.01)

(56) References Cited

U.S. PATENT DOCUMENTS

| | | | |
|---|---|---|---|
| 7,335,321 B1* | 2/2008 | Birke | H01M 10/058 429/231.95 |
| 2009/0148756 A1* | 6/2009 | Specht | H01M 4/382 429/94 |
| 2010/0310910 A1* | 12/2010 | Huang | H01M 4/136 429/94 |
| 2011/0027652 A1 | 2/2011 | Morigaki | |
| 2011/0059358 A1* | 3/2011 | Morigaki | H01M 6/168 429/188 |
| 2012/0249048 A1* | 10/2012 | Nishibayashi | H02J 13/00017 320/101 |
| 2014/0125285 A1* | 5/2014 | Pozin | H01M 4/136 429/163 |
| 2014/0163762 A1* | 6/2014 | Nakamura | H02J 3/466 700/295 |
| 2014/0316600 A1* | 10/2014 | Jammer | H02J 3/322 700/297 |
| 2017/0179473 A1* | 6/2017 | Kawai | H01M 10/0525 |
| 2020/0403219 A1* | 12/2020 | Hoshina | H01M 10/0525 |

* cited by examiner

LITHIUM PRIMARY CELL WITH A POSITIVE ELECTRODE INCLUDING MANGANESE DIOXIDE AND A BORON COMPOUND

CROSS-REFERENCE TO RELATED APPLICATIONS

This application is a U.S. national stage application of the PCT International Application No. PCT/JP2019/014568 filed on Apr. 2, 2019, which claims the benefit of foreign priority of Japanese patent application No. 2018-137982, filed on Jul. 23, 2018, the contents all of which are incorporated herein by reference.

TECHNICAL FIELD

The present invention relates to a lithium primary cell and a smart meter.

BACKGROUND ART

Lithium primary cells have high energy density and low self-discharge property, and therefore they are used in many electronic devices. Lithium primary cells have an extremely long storage life, and can be stored at room temperatures for such a long time as ten years or more. Therefore, lithium primary cells are widely used as main power sources and memory back-up power sources in various meters.

For example, as a power source of a gas meter, a cylindrical lithium primary cell having a size of A or smaller is used. The cylindrical lithium primary cell includes an electrode group including a positive electrode and a negative electrode wound with a separator interposed therebetween. A lithium primary cell having such a spiral-structured electrode group has a high output property, and a large electric current can be taken out.

On the other hand, PTL 1 proposes a coin-type lithium primary cell in which low-crystalline manganese dioxide having a specific surface area of 8 to 28 m²/g and including boron and alkaline earth metal, is used for a positive electrode active material. This suppresses generation of gas during high-temperature storage.

CITATION LIST

Patent Literature

PTL 1: Japanese Patent Application Unexamined Publication No. 2009-266736

SUMMARY OF THE INVENTION

In recent years, with the spread of smart meters, cylindrical lithium primary cells having a large size and high capacity (for example, C-size and D-size cells) have been demanded as power sources for smart meters. However, lithium primary cells having high capacity and having a spiral structured electrode group, a problem of short-circuit current, which has not occurred in A-size and coin-type cells, may occur. Specific examples of the problem include a problem that a large short-circuit current exceeding the allowable value may flow when an external short circuit occurs.

One aspect of the present disclosure relates to a lithium primary cell including an electrode group including a positive electrode, a negative electrode, and a separator, the positive electrode and the negative electrode being wound with the separator interposed between the positive electrode and the negative electrode; and a non-aqueous electrolytic solution, wherein in the electrode group, an area where the positive electrode and the negative electrode face each other is 250 cm² or more and 350 cm² or less, the positive electrode includes a positive electrode mixture including manganese dioxide and a boron compound, the negative electrode includes lithium metal or a lithium alloy, the non-aqueous electrolytic solution includes ethylene carbonate, a content of the boron compound in the positive electrode is 0.5 parts by mass or more and 2 parts by mass or less in terms of boron with respect to 100 parts by mass of the positive electrode mixture, and a content of the ethylene carbonate in the non-aqueous electrolytic solution is 1 part by mass or more and 10 parts by mass or less with respect to 100 parts by mass of the manganese dioxide.

Another aspect of the present disclosure relates to a lithium primary cell including an electrode group including a positive electrode, a negative electrode, and a separator, the positive electrode and the negative electrode being wound with the separator interposed between the positive electrode and the negative electrode; and a non-aqueous electrolytic solution, wherein in the electrode group, an area where the positive electrode and the negative electrode face each other is 250 cm² or more and 350 cm² or less, the positive electrode includes a positive electrode mixture including manganese dioxide and a boron compound, the negative electrode includes lithium metal or a lithium alloy, the non-aqueous electrolytic solution includes ethylene carbonate, a mass ratio B/Mn of boron (B) included in the boron compound present in the positive electrode to manganese (Mn) included in the manganese dioxide present in the positive electrode is 0.009 or more and 0.036 or less, and a content of the ethylene carbonate in the non-aqueous electrolytic solution is 1 part by mass or more and 10 parts by mass or less with respect to 100 parts by mass of the manganese dioxide.

According to the present disclosure, in a cylindrical lithium primary cell having property with high output and high capacity, a short-circuit current at an external short circuit can be reduced.

DESCRIPTION OF EMBODIMENTS

A lithium primary cell in accordance with an exemplary embodiment of the present invention has high output and high capacity. That is to say, the lithium primary cell includes an electrode group including a positive electrode, a negative electrode, and a separator, the positive electrode and the negative electrode being wound with the separator interposed therebetween; and a non-aqueous electrolytic solution with which the electrode group is impregnated. In the electrode group, an area where the positive electrode and the negative electrode face each other is 250 cm² or more and 350 cm² or less. The positive electrode includes a positive electrode mixture including manganese dioxide as a positive electrode active material. The negative electrode includes lithium metal or a lithium alloy as a negative electrode active material. Herein, the area where the positive electrode and the negative electrode face each other is an area in which an electrode reaction can proceed, and, usually, an area where lithium metal or a lithium alloy faces a positive electrode mixture layer including a positive electrode active material.

The positive electrode mixture includes a boron compound. A content of the boron compound in the positive electrode is 0.5 parts by mass or more and 2 parts by mass or less in terms of boron with respect to 100 parts by mass of the positive electrode mixture. Not here that "in terms of boron" means that an amount of a boron compound (part by mass) with respect to 100 parts by mass of the positive electrode mixture is converted into an amount of boron (parts by mass). The non-aqueous electrolytic solution includes ethylene carbonate (EC). A content of EC in the non-aqueous electrolytic solution is 1 part by mass or more and 10 parts by mass or less with respect to 100 parts by mass of manganese dioxide.

In general, in a lithium primary cell including a spiral-structured electrode group, when the area where the positive electrode and the negative electrode face each other is increased to 250 cm$^2$ or more, high cell capacity required for a smart meter and the like is obtained. On the contrary, when an external short circuit occurs, a short-circuit current exceeding the allowable value flows.

In response to this, when a positive electrode including a predetermined amount of boron compound and a non-aqueous electrolytic solution including a predetermined amount of EC are used in combination, even if an area of facing the positive electrode and the negative electrode is large, such as 250 cm$^2$ or more, the short-circuit current when an external short circuit occurs can be reduced to be the allowable value or less. However, the area of facing the positive electrode and the negative electrode is more than 350 cm$^2$, even if the positive electrode includes a predetermined amount of boron compound, and the non-aqueous electrolytic solution includes a predetermined amount of EC, a short-circuit current when an external short circuit occurs may exceed the allowable value.

The short-circuit current is presumed to be reduced because use of a positive electrode including a predetermined amount of boron compound and a non-aqueous electrolytic solution including a predetermined amount of EC allows a good SEI (Solid Electrolyte Interface) film that suppresses a rapid electrode reaction to be appropriately formed on a surface of the positive electrode active material and the negative electrode active material.

When the content of the boron compound in the positive electrode is less than 0.5 parts by mass in terms of boron with respect to 100 parts by mass of the positive electrode mixture, the effect of reducing the short-circuit current becomes smaller. Therefore, when the area of facing the positive electrode and the negative electrode is increased to 250 cm$^2$ or more, the short-circuit current may exceed the allowable value when an external short circuit occurs.

Furthermore, when the content of the boron compound in the positive electrode is more than 2 parts by mass in terms of boron with respect to 100 parts by mass of the positive electrode mixture, the short-circuit current may exceed the allowable value when an external short circuit occurs. This is presumed to be because the formation of a good SEI film is inhibited due to the imbalance of the reaction on a solid-liquid interface.

When the content of the boron compound in the positive electrode is 0.5 parts by mass or more and 2 parts by mass or less in terms of boron with respect to 100 parts by mass of the positive electrode mixture, the mass ratio B/Mn of boron (B) to manganese (Mn) included in the positive electrode is, for example, 0.009 or more and 0.036 or less.

That is to say, another aspect of the present invention relates to a lithium primary cell including an electrode group including a positive electrode, a negative electrode, and a separator, the positive electrode and the negative electrode being wound with the separator interposed between the positive electrode and the negative electrode; and a non-aqueous electrolytic solution, wherein in the electrode group, an area where the positive electrode and the negative electrode face each other is 250 cm$^2$ or more and 350 cm$^2$ or less, the positive electrode includes a positive electrode mixture including manganese dioxide and a boron compound, the negative electrode includes lithium metal or a lithium alloy, the non-aqueous electrolytic solution includes ethylene carbonate, a mass ratio B/Mn of boron (B) included in the boron compound present in the positive electrode to manganese (Mn) included in the manganese dioxide present in the positive electrode is 0.009 or more and 0.036 or less, and a content of the ethylene carbonate in the non-aqueous electrolytic solution is 1 part by mass or more and 10 parts by mass or less with respect to 100 parts by mass of the manganese dioxide.

The content of the boron compound in the positive electrode and the B/Mn ratio can be obtained by, for example, ICP optical emission spectrometry. Specifically, the content rate of boron derived from the boron compound in the positive electrode mixture layer and B/Mn can be obtained by the following procedures (i) to (iv).

(i) Disassemble an unused cell, and take out a positive electrode.

(ii) When a lithium salt of the non-aqueous electrolytic solution includes B, wash the positive electrode with a non-aqueous solvent to remove the non-aqueous electrolytic solution attached to the positive electrode. Thereafter, remove the non-aqueous solvent attached to the positive electrode by drying. Note here that the boron compound in the positive electrode mixture layer includes a boron atom and an oxygen atom, and therefore is not easily dissolved in the non-aqueous solvent.

(iii) Take of the positive electrode mixture layer from the positive electrode current collector, measure the mass We of the positive electrode mixture layer. Dissolve the positive electrode mixture layer in hydrochloric acid to obtain a sample solution. When the positive electrode mixture layer is not easily dissolved, aqua regia, hydrofluoric acid, or the like, may be used instead of hydrochloric acid. A product obtained by ashing an insoluble component of hydrochloric acid of the positive electrode mixture layer may be dissolved in hydrochloric acid or the like.

(iv) The obtained sample solution is used to obtain a B amount $W_B$ and a Mn amount $W_{Mn}$ included in the positive electrode mixture layer by ICP optical emission spectrometry. $W_B/W_C \times 100$ is defined as an amount of B (part by mass) derived from the boron compound with respect to 100 parts by mass of the positive electrode mixture. Furthermore, $W_B/W_{Mn}$ is defined as B/Mn.

Note here that a part of the boron compound included in the positive electrode mixture layer may be decomposed in the positive electrode, and a part of B in the boron compound may be incorporated into the manganese dioxide included in the positive electrode mixture layer. B derived from the boron compound incorporated in the manganese dioxide also contributes to reduction of the short-circuit current when an external short circuit occurs.

Furthermore, when the lithium salt of the non-aqueous electrolytic solution includes B, a part of the lithium salt of the non-aqueous electrolytic solution may be decomposed at the positive electrode, and a part of B of the lithium salt may be incorporated into the manganese dioxide included in the positive electrode mixture layer. However, an amount of B derived from the lithium salt incorporated in the manganese dioxide is a minute amount and is a negligible level as compared with the amount of B derived from the boron compound included in the positive electrode mixture layer. Thus, even when the lithium salt of the non-aqueous electrolytic solution includes B, the above-mentioned $W_B$ is obtained as an amount of B derived from the boron compound included in the positive electrode mixture layer. With only the amount of B derived from the lithium salt incorporated in manganese dioxide, the effect of reducing a short-circuit current when an external short circuit occurs cannot be obtained.

From the viewpoint of reducing the short-circuit current when an external short circuit occurs, the content of the boron compound in the positive electrode is preferably 1 part by mass or more and 2 parts by mass or less in terms of boron with respect to 100 parts by mass of the positive electrode mixture.

As the boron compound, a compound including a boron atom and an oxygen atom can be used. Since such a compound has water solubility, when the compound is used as an aqueous solution, it can be uniformly mixed with the positive electrode active material. On the other hand, the compound including a boron atom and an oxygen atom does not easily elute into the non-aqueous electrolytic solution and easily remains in the positive electrode.

More specifically, the boron compound preferably includes at least one selected from the group consisting of, for example, $H_3BO_3$, $B_2O_3$, $HBO_2$, $H_4B_2O_4$, $Li_3BO_3$, $LiBO_2$ and $Li_4B_2O_4$. Among them, from the viewpoint that the effect of reducing the short-circuit current is obtained efficiently, $H_3BO_3$ is preferable.

When the content of EC in the non-aqueous electrolytic solution is less than 1 part by mass with respect to 100 parts by mass of manganese dioxide, since the effect of reducing the short-circuit current is decreased, when an area of facing the positive electrode and the negative electrode increased to 250 cm² or more, the short-circuit current may exceed the allowable value when an external short circuit occurs.

Furthermore, when the content of EC in the non-aqueous electrolytic solution is more than 10 parts by mass with respect to 100 parts by mass of manganese dioxide, the short-circuit current may exceed the allowable value when an external short circuit occurs. This is presumed to be because the formation of a good SEI film is inhibited due to the imbalance of the reaction at the solid-liquid interface.

From the viewpoint of reducing a short-circuit current when an external short circuit occurs, the content of EC in the non-aqueous electrolytic solution is preferably 1 part by mass or more and 5 parts by mass or less with respect to 100 parts by mass of manganese dioxide.

The content of EC (the amount with respect to 100 parts by mass of manganese dioxide) in the non-aqueous electrolytic solution can be obtained by the following procedures (I) to (III).

(I) For unused cell, measure mass $W_1$ of the cell. Disassemble the cell to collect a non-aqueous electrolytic solution and decompose to constituent members of the cell such as an electrode group, and a cell can. Wash the constituent members of the cell with a non-aqueous solvent to remove a non-aqueous electrolytic solution attached to the constituent members of the cell. Thereafter, remove the non-aqueous solvent attached to the constituent members of the cell by drying. Thereafter, measure the total mass $W_2$ of the constituent members of the cell. $(W_1-W_2)$ is defined as an amount $W_{NE}$ of non-aqueous electrolytic solution included in the cell.

(II) Obtain the EC concentration $C_{EC}$ in the non-aqueous electrolytic solution by gas chromatography-mass spectrometry (GCMS) using the non-aqueous electrolytic solution collected in the above (I).

(III) Obtain an amount of EC with respect to 100 parts by mass of manganese dioxide by using the amount of the non-aqueous electrolytic solution $W_{NE}$ obtained above, EC concentration $C_{EC}$ in the non-aqueous electrolytic solution, and a Mn amount $W_{Mn}$ included in the positive electrode mixture layer obtained by the measurement of the amount of boron mentioned above.

The positive electrode includes a positive electrode current collector, and a positive electrode mixture layer attached to the positive electrode current collector. The positive electrode mixture layer is formed, for example, on both surfaces of a sheet-like positive electrode current collector, such that the sheet-like positive electrode current collector is embedded. The positive electrode mixture layer includes manganese dioxide and a boron compound. The positive electrode mixture layer may include a conductive agent and/or a binder in addition to the manganese dioxide and the boron compound. For the conductive agent, a conductive material such as a carbon material is used. For the binder, for example, fluororesin is used. The positive electrode current collector is, for example, an expanded metal, net, punching metal, or the like, made of stainless steel. The positive electrode mixture layer is formed using, for example, a wet positive electrode mixture prepared by adding an appropriate amount of water to the manganese dioxide and the boron compound. To the positive electrode mixture, a conductive agent and a binder may further be added.

The negative electrode includes lithium metal or a lithium alloy. The lithium metal or the lithium alloy is formed, for example, in a long sheet by extrusion molding, and is used as a negative electrode. As the lithium alloy, alloys such as Li—Al, Li—Sn, Li—Ni—Si, and Li—Pb are used, but a Li—Al alloy is preferable. The content of metallic elements other than lithium, included in the lithium alloy, is preferably 0.1% by mass or more and 5% by mass or less from the viewpoint of securing discharge capacity and stabilization of internal resistance.

A separator may be a porous sheet formed of an insulating material having resistance against the internal environment of a lithium primary cell. Specific examples thereof include a non-woven cloth made of synthetic resin and a microporous film made of synthetic resin, and the like.

The non-aqueous electrolytic solution includes a non-aqueous solvent, and lithium salt dissolved in the non-aqueous solvent. The non-aqueous solvent includes at least EC. The content of EC in the non-aqueous solvent is preferably, for example, 3% by volume or more and 33% by volume or less.

As the non-aqueous solvent, in addition to EC, γ-butyrolactone (GBL), propylene carbonate (PC), 1,2-dimethoxyethane (DME), and the like, can be used. EC, PC, and DME are preferably 70% by volume or more in total amount with respect to the non-aqueous solvent.

Examples of the lithium salt include lithium borofluoride, lithium hexafluorophosphate, lithium trifluoromethanesulfonate, lithium-bis(fluorosulfonyl)imide, lithium-bis(trifluoromethane sulfonyl)imide, and the like.

Next, with reference to the drawing, the lithium primary cell in accordance with the exemplary embodiment of the present invention is described further specifically. However, the present invention is not limited to the below-mentioned exemplary embodiment.

Figure 1:
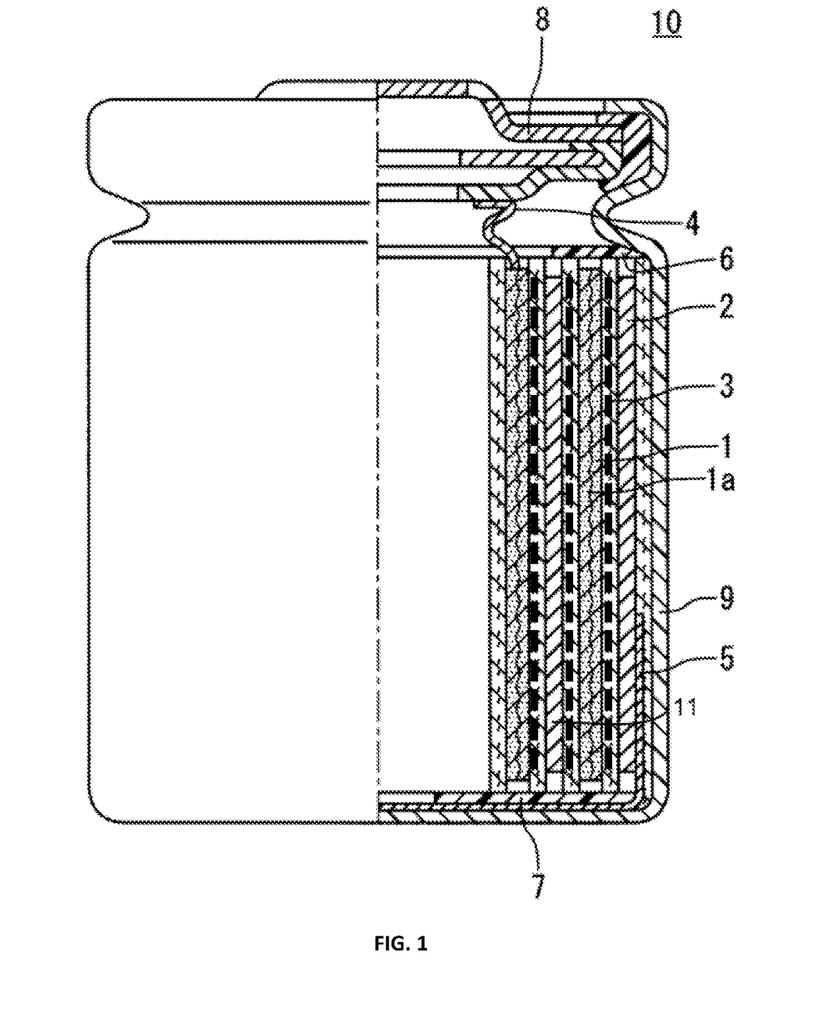
FIG. 1 is a partially sectional front view of a lithium primary cell in accordance with one exemplary embodiment of the present invention.
Figure 2:
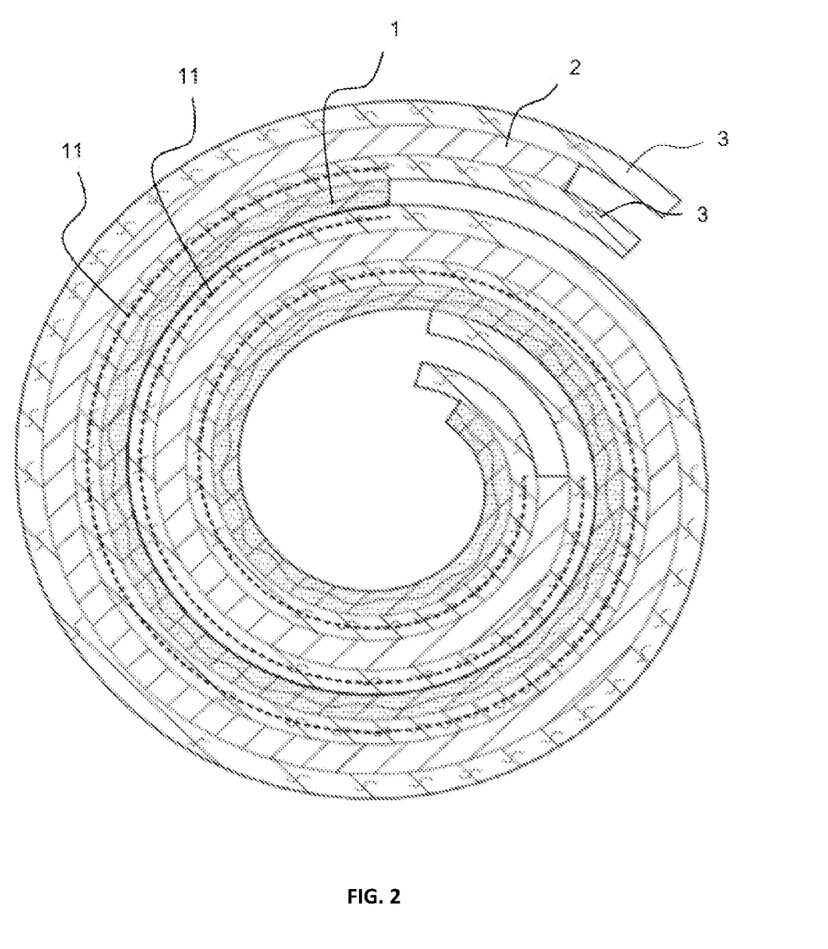
FIG. 2 is a cross-sectional view of the lithium primary cell in FIG. 1.

FIG. 1 is a partial sectional front view of a cylindrical lithium primary cell in accordance with an exemplary embodiment of the present invention. The cross-sectional view of the lithium primary cell in FIG. 1 is shown in FIG. 2.

Cylindrical lithium primary cell 10 includes bandlike positive electrode 1 and bandlike negative electrode 2 made of a sheet of lithium metal or a lithium alloy. Positive electrode 1 and negative electrode 2 are spirally wound with separator 3 interposed therebetween to constitute a columnar electrode group.

An area 11 of facing positive electrode 1 and negative electrode 2 in the electrode group is 250 $cm^2$ or more and 350 $cm^2$ or less. The width of bandlike positive electrode 1 is, for example, 37 mm or more and 40 mm or less. The length of bandlike positive electrode 1 is, for example, 370 mm or more and 520 mm or less. The thickness of positive electrode 1 is, for example, 0.4 mm or more and 0.6 mm or less. The width of bandlike negative electrode 2 is, for example, 34 mm or more and 37 mm or less. The length of bandlike negative electrode 2 is, for example, 450 mm or more and 520 mm or less. The thickness of negative electrode 2 is, for example, 0.15 mm or more and 0.25 mm or less.

Positive electrode 1 includes positive electrode current collector 1a, and a positive electrode mixture layer attached to positive electrode current collector 1a. The positive electrode mixture layer includes at least a positive electrode mixture and a boron compound. The content of the boron compound in positive electrode 1 is 0.5 parts by mass or more and 2 parts by mass or less in terms of boron with respect to 100 parts by mass of the positive electrode mixture. An amount of the manganese dioxide included in the positive electrode mixture layer is, for example, 2.5 g or more and 3.2 g or less with respect to 1 $cm^3$ of the positive electrode mixture layer.

The electrode group together with a non-aqueous electrolytic solution (not shown) are housed inside a metal case (cell can 9) having an opening and a bottom. The non-aqueous electrolytic solution includes 1 part by mass or more and 10 parts by mass or less of EC with respect to 100 parts by mass of manganese dioxide. In order to prevent an internal short-circuit, the upper part and the lower part of the electrode group are provided with upper insulating plate 6 and lower insulating plate 7, respectively. The metal case generally includes iron, stainless steel, and the like. The inner diameter of the metal case is, for example, 23 mm or more and 25.5 mm or less.

Positive electrode 1 includes, in the vicinity of its center in the thickness direction, a sheet-like positive electrode current collector 1a. Positive electrode 1 has a part in which a portion of the positive electrode mixture layer is removed such that positive electrode current collector 1a is exposed, and one end of positive electrode tab lead 4 is welded to the exposed part. The other end of positive electrode tab lead 4 is welded to the inner surface of sealing plate 8 for sealing the opening of the cell can 9. One end of negative electrode tab lead 5 is welded to negative electrode 2. The other end of tab lead 5 is welded to the inner bottom surface of cell can 9.

Furthermore, the smart meter of the present invention includes a gas meter, a communication device, and the above-described lithium primary cell supplying the gas meter and the communication device with electric power.

Since July 2003, in Europe, devices to be used in a predetermined atmosphere are obliged to comply with the ATEX Directive. In the ATEX Directive, an external short circuit current for a gas meter is regulated at 5 A or less.

Furthermore, in the smart meter, the lithium primary cell needs to supply not only a gas meter but also a communication device with electric power. Therefore, for the lithium primary cell to be used for power source of the smart meter is required to have high capacity.

In this point, the lithium primary cell in accordance with the present invention can obtain high capacity required to the smart meter, and can suppress the external short circuit current to 5 A or less. Thus, use of the lithium primary cell in accordance with the present invention permits obtaining of a smart meter capable of sufficiently supplying the gas meter and the communication device with electric power, and conforming the ATEX Directive and being excellent in safety.

EXAMPLE

Hereinafter, the present invention is specifically described based on Examples and Comparative Examples, but the present invention is not limited to the following Examples.

Example 1

(1) Production of Positive Electrode

A wet positive electrode mixture was prepared by adding 5 parts by mass of Ketjen black as a conductive agent, 5 parts by mass of polytetrafluoroethylene as a binder, a boron compound, and a proper amount of pure water to 100 parts by mass of electrolytic manganese dioxide as a positive electrode active material, and kneading the resultant mixture. Boric acid $H_3BO_3$ was used for the boron compound. The additive amount of the boron compound was 1.0 part by mass in terms of boron with respect to 100 parts by mass of the positive electrode mixture. The mass ratio B/Mn of boron to manganese included in the positive electrode mixture was 0.018.

Next, the wet positive electrode mixture together with positive electrode current collector 1a including expanded metal having a thickness of 0.3 mm and made of stainless steel were allowed to pass between a pair of rotating rollers rotating at a constant speed, thereby filling pores of the expanded metal with the positive electrode mixture, and covering both surfaces of the expanded metal with the positive electrode mixture layers to produce an electrode plate precursor. Then, the electrode plate precursor was dried, rolled by a roll press until the thickness became 0.4 mm, and cut into a predetermined size to obtain bandlike positive electrode 1. The width of positive electrode 1 was 37 mm, and the length of positive electrode 1 was 450 mm.

(2) Production of Negative Electrode

A sheet-like Li—Al alloy (Al content: 0.1% by mass) having a thickness of 0.17 mm was cut into a predetermined dimension to obtain a bandlike negative electrode 2. The width of negative electrode 2 was 34 mm, and the length of negative electrode 2 was 495 mm.

(3) Production of Electrode Group

A positive electrode mixture material was removed from a portion of positive electrode 1 to expose a positive electrode current collector, and positive electrode lead 4 made of stainless steel was welded to the exposed part. Negative electrode tab lead 5 made of nickel was welded to a predetermined section of negative electrode 2. Positive electrode 1 and negative electrode 2 were spirally wound with separator 3 interposed therebetween to constitute a columnar electrode group having an area 11 of facing the positive electrode and the negative electrode of 300 cm$^2$. For separator 3, a microporous membrane (porosity: 40%) made of polyethylene and having a thickness of 38 µm was used.

(4) Preparation of Non-Aqueous Electrolytic Solution

A non-aqueous electrolytic solution was prepared by dissolving lithium trifluoromethanesulfonate as a lithium salt at a concentration of 0.2 mol/L in a solvent obtained by mixing propylene carbonate (PC) and 1,2-dimethoxyethane (DME) in a volume ratio of 2:1. In addition, 5 parts by mass of ethylene carbonate (EC) with respect to 100 parts by mass of electrolytic manganese dioxide was added to the non-aqueous electrolytic solution. Note here that the volume ratio of EC with respect to the total of EC, PC, and DME was 16% by volume.

(5) Assembly of Cylindrical Cell

An electrode group, with ring-shaped lower insulating plate 7 placed at its bottom, was inserted into the inside of cylindrical cell can 9 (inner diameter: 24.8 mm) having a bottom and being made of iron. Thereafter, positive electrode tab lead 4 was welded to the inner surface of sealing plate 8, and negative electrode tab lead 5 was welded to the inner bottom surface of cell can 9. Next, a non-aqueous electrolytic solution was injected into the inside of cell can 9, upper insulating plate 6 was disposed on the upper part of the electrode group, and then, an opening of cell can 9 was sealed by sealing plate 8. In this way, a C size cylindrical lithium cell (diameter: 25.4 mm, height: 50.5 mm, nominal capacity: 6000 mAh) having a structure shown in FIG. 1 was produced. A cell of Example 1 is referred to as cell A1.

[Evaluation]

Cell A1 is subjected to the external short circuit test according to the UN Recommendation Test T5, and the maximum value of the short-circuit current at this time was measured. A case in which the maximum value of the short-circuit current is 5 A or less is evaluated that the short-circuit current is small based on the ATEX Directive.

Comparative Example 1

Cell B1 was produced in the same manner as in Example 1 except that a boron compound was not added to a positive electrode mixture, and EC was not added to a non-aqueous electrolytic solution, and the produced cell B1 was evaluated.

Comparative Example 2

Cell B2 was produced in the same manner as in Example 1 except that EC was not added to a non-aqueous electrolytic solution, and the produced cell B2 was evaluated.

Comparative Example 3

Cell B3 was produced in the same manner as in Example 1 except that the boron compound was not added to a positive electrode mixture, and the produced cell B3 was evaluated.

The evaluation results of cell A1 and cells B1 to B3 are shown in Table 1. Note here that each content of the boron compound in the positive electrode shown in Table 1 and the below-mentioned Tables 2 to 5 is an amount (part by mass) in terms of boron with respect to 100 parts by mass of the positive electrode mixture. Furthermore, each content of EC in the non-aqueous electrolytic solution is an amount (part by mass) with respect to 100 parts by mass of manganese dioxide.

TABLE 1

| Battery No. | Facing area of positive electrode and negative electrode (cm$^2$) | Boron compound | Content of boron compound in positive electrode part by (mass) | Content of EC in non-aqueous solution (part by mass) | Maximum short-circuit current (A) |
|---|---|---|---|---|---|
| A1 | 300 | H$_3$BO$_3$ | 1 | 5 | 4.1 |
| B1 | 300 | — | 0 | 0 | 5.9 |
| B2 | 300 | H$_3$BO$_3$ | 1 | 0 | 5.8 |
| B3 | 300 | — | 0 | 5 | 6.0 |

In cell A1 including the positive electrode including a predetermined amount of a boron compound and the non-aqueous electrolytic solution including a predetermined amount of EC, the maximum short-circuit current is 5 A or less. In cell B1 using a positive electrode not including a boron compound, and a non-aqueous electrolytic solution not including EC, in cell B2 using a non-aqueous electrolytic solution not including EC, and in cell B3 using a positive electrode not including a boron compound, the maximum short-circuit current exceeds 5 A.

Comparative Examples 4 to 7

Cells B4 to B7 were produced in the same manner as in Comparative Example 1 except that a length of a positive electrode and a length of a negative electrode were adjusted such that an area of facing the positive electrode and the negative electrode in the electrode group became values shown in Table 2. The evaluation results of cells B4 to B7 together with the evaluation result of cell B1 are shown in Table 2.

Examples 2 to 3 and Comparative Example 8

Cells A2 to A3 and cell B8 were produced in the same manner as in Example 1 except that a length of the positive electrode and a length of the negative electrode were adjusted such that an area of facing the positive electrode and the negative electrode in the electrode group became values shown in Table 3, and cells A2 to A3 and cell B8 were evaluated. The evaluation results of A2 to A3 and cell B8 together with the evaluation result of cell A1 are shown in Table 3.

TABLE 2

| Battery No. | Facing area of positive electrode and negative electrode (cm$^2$) | Boron compound | Content of boron compound in positive electrode (part by mass) | Content of EC in non-aqueous solution (part by mass) | Maximum short-circuit current (A) |
|---|---|---|---|---|---|
| B4 | 100 | — | 0 | 0 | 3.0 |
| B5 | 150 | — | 0 | 0 | 3.8 |

TABLE 2-continued

| Battery No. | Facing area of positive electrode and negative electrode (cm²) | Boron compound | Content of boron compound in positive electrode (part by mass) | Content of EC in non-aqueous solution (part by mass) | Maximum short-circuit current (A) |
|---|---|---|---|---|---|
| B6 | 250 | — | 0 | 0 | 5.1 |
| B1 | 300 | — | 0 | 0 | 5.9 |
| B7 | 350 | — | 0 | 0 | 6.5 |

TABLE 3

| Battery No. | Facing area of positive electrode and negative electrode (cm²) | Boron compound | Content of boron compound in positive electrode (part by mass) | Content of EC in non-aqueous solution (part by mass) | Maximum short-circuit current (A) |
|---|---|---|---|---|---|
| A2 | 250 | $H_3BO_3$ | 1 | 5 | 3.6 |
| A1 | 300 | $H_3BO_3$ | 1 | 5 | 4.1 |
| A3 | 350 | $H_3BO_3$ | 1 | 5 | 4.8 |
| B8 | 400 | $H_3BO_3$ | 1 | 5 | 5.2 |

In cells B4 and B5, even if the positive electrode does not include a boron compound and the non-aqueous electrolytic solution does not include EC, the maximum short-circuit current is 5 A or less. However, in cells B4 and B5, the area of facing the positive electrode and the negative electrode is less than 250 cm², and therefore high capacity required to a smart meter cannot be obtained.

In cells B1, B6, and B7 having a high capacity in which an area of facing the positive electrode and the negative electrode is 250 cm² or more, since the positive electrode does not include the boron compound, and the non-aqueous electrolytic solution does not include EC, the maximum short-circuit current exceeds 5 A.

In cells A1, A2, and A3 having a high capacity and having an area of facing the positive electrode and the negative electrode of 250 cm² or more and 350 cm² or less, since the positive electrode includes the boron compound and the non-aqueous electrolytic solution includes EC, the maximum short-circuit current is 5 A or less. In cell B8 having an area of facing the positive electrode and the negative electrode of more than 350 cm², even if the positive electrode includes the boron compound, and the non-aqueous electrolytic solution includes EC, the maximum short-circuit current exceeds 5 A.

Examples 4 to 11 and Comparative Examples 9 to 21
Cells A4 to A11 and cells B9 to B21 were produced in the same manner as in Example 1 except that each content of the boron compound in each positive electrode (an amount in terms of boron with respect to 100 parts by mass of a positive electrode mixture) was the value shown in Table 4; the ratios of B/Mn when the content of the boron compound in the positive electrode was 0.5 parts by mass, 1 part by mass, and 2 parts by mass were 0.009, 0.018, and 0.036, respectively; and each content of EC in the non-aqueous electrolytic solution was the values shown in Table 4. The produced Cells A4 to A11 and cells B9 to B21 were evaluated.

The evaluation results of cells A4 to A11 and cells B9 to B21 together with the evaluation results of cell A1 and cells B1 to B3 are shown in Table 4.

TABLE 4

| Battery No. | Facing area of positive electrode and negative electrode (cm²) | Boron compound | Content of boron compound in positive electrode (part by mass) | Content of EC in non-aqueous solution (part by mass) | Maximum short-circuit current (A) |
|---|---|---|---|---|---|
| B1 | 300 | $H_3BO_3$ | 0 | 0 | 5.9 |
| B9 | 300 | $H_3BO_3$ | 0.5 | 0 | 5.9 |
| B2 | 300 | $H_3BO_3$ | 1 | 0 | 5.8 |
| B10 | 300 | $H_3BO_3$ | 2 | 0 | 5.6 |
| B11 | 300 | $H_3BO_3$ | 4 | 0 | 5.7 |
| B12 | 300 | $H_3BO_3$ | 0 | 1 | 5.8 |
| A4 | 300 | $H_3BO_3$ | 0.5 | 1 | 4.3 |
| A5 | 300 | $H_3BO_3$ | 1 | 1 | 4.2 |
| A6 | 300 | $H_3BO_3$ | 2 | 1 | 4.2 |
| B13 | 300 | $H_3BO_3$ | 4 | 1 | 5.3 |
| B3 | 300 | $H_3BO_3$ | 0 | 5 | 6.0 |
| A7 | 300 | $H_3BO_3$ | 0.5 | 5 | 4.2 |
| A1 | 300 | $H_3BO_3$ | 1 | 5 | 4.1 |
| A8 | 300 | $H_3BO_3$ | 2 | 5 | 4.1 |
| B14 | 300 | $H_3BO_3$ | 4 | 5 | 5.4 |
| B15 | 300 | $H_3BO_3$ | 0 | 10 | 5.7 |
| A9 | 300 | $H_3BO_3$ | 0.5 | 10 | 4.8 |
| A10 | 300 | $H_3BO_3$ | 1 | 10 | 4.7 |
| A11 | 300 | $H_3BO_3$ | 2 | 10 | 4.7 |
| B16 | 300 | $H_3BO_3$ | 4 | 10 | 5.5 |
| B17 | 300 | $H_3BO_3$ | 0 | 15 | 5.8 |
| B18 | 300 | $H_3BO_3$ | 0.5 | 15 | 5.3 |
| B19 | 300 | $H_3BO_3$ | 1 | 15 | 5.2 |
| B20 | 300 | $H_3BO_3$ | 2 | 15 | 5.2 |
| B21 | 300 | $H_3BO_3$ | 4 | 15 | 5.4 |

In cells A1, A4 to A11 using a positive electrode having the content of the boron compound of 0.5 parts by mass or more and 2 parts by mass or less in terms of boron with respect to 100 parts by mass of the positive electrode mixture, and a non-aqueous electrolytic solution having the content of EC of 1 part by mass or more and 10 parts by mass or less with respect to 100 parts by mass of manganese dioxide, the maximum short-circuit current is 5 A or less.

In cells B2, B9, and B10, since a positive electrode having a content of a boron compound of 0.5 parts by mass or more and 2 parts by mass or less in terms of boron with respect to 100 parts by mass of the positive electrode mixture is used, but a non-aqueous electrolytic solution not including EC is used, the maximum short-circuit current exceeds 5 A. In cell B11, since a positive electrode having the content of the boron compound of more than 2 parts by mass in terms of boron with respect to 100 parts by mass of the positive electrode mixture, and a non-aqueous electrolytic solution not including EC are used, the maximum short-circuit current exceeds 5 A.

In cells B12, B3, and B15, since a positive electrode not including a boron compound is used, the maximum short-circuit current exceeds 5 A. In cell B17, since the positive electrode not including a boron compound and a non-aqueous electrolytic solution having the content of EC of more than 10 parts by mass with respect to 100 parts by mass of manganese dioxide are used, the maximum short-circuit current exceeds 5 A.

In cells B13, B14, and B16, since a non-aqueous electrolytic solution having the content of EC of 1 part by mass or more and 10 parts by mass or less is used, but a positive electrode having the content of the boron compound of more than 2 parts by mass in terms of boron with respect to 100 parts by mass of the positive electrode mixture is used, the maximum short-circuit current exceeds 5 A.

In cells B18 to B20, since a positive electrode having the content of the boron compound of 0.5 parts by mass or more and 2 parts by mass or less in terms of boron with respect to 100 parts by mass of the positive electrode mixture is used, but a non-aqueous electrolytic solution having the content of EC of more than 10 parts by mass with respect to 100 parts by mass of manganese dioxide is used, the maximum short-circuit current exceeds 5 A.

In cell B21, since a positive electrode having the content of the boron compound of more than 2 parts by mass in terms of boron with respect to 100 parts by mass of the positive electrode mixture is used, and a non-aqueous electrolytic solution having the content of EC of more than 10 parts by mass with respect to 100 parts by mass of manganese dioxide is used, the maximum short-circuit current exceeds 5 A.

Examples 12 to 14

Cells A12 to A14 were produced in the same manner as in Example 1 except that compounds shown in Table 5 were used for a boron compound, and cells A12 to A14 were evaluated. Cells A12 to A14 had B/Mn of 0.018. The evaluation results of cells A12 to A14 together with evaluation results of cell A1 and cell B1 are shown in Table 5.

TABLE 5

| Battery No. | Facing area of positive electrode and negative electrode (cm$^2$) | Boron compound | Content of boron compound in positive electrode (part by mass) | Content of EC in non-aqueous solution (part by mass) | Maximum short-circuit current (A) |
|---|---|---|---|---|---|
| B1 | 300 | — | 0 | 0 | 5.9 |
| A1 | 300 | H$_3$BO$_3$ | 1 | 5 | 4.1 |
| A12 | 300 | B$_2$O$_2$ | 1 | 5 | 4.0 |
| A13 | 300 | HBO$_2$ | 1 | 5 | 4.2 |
| A14 | 300 | Li$_3$BO$_3$ | 1 | 5 | 4.4 |

Also in cells A12 to A14, similar to cell A1, the maximum short-circuit current is 5 A or less.

INDUSTRIAL APPLICABILITY

A lithium primary cell in accordance with the present invention is suitably used as a power source of electronic devices such as a smart meter that requires, for example, excellent cell performance and high safety.

REFERENCE MARKS IN THE DRAWINGS 1 positive electrode
1a positive electrode current collector
2 negative electrode
3 separator
4 positive electrode tab lead
5 negative electrode tab lead
6 upper insulating plate
7 lower insulating plate
8 sealing plate
9 cell can
10 lithium primary cell

The invention claimed is:
1. A lithium primary cell comprising:
an electrode group including a positive electrode, a negative electrode, and a separator, the positive electrode and the negative electrode being wound with the separator interposed between the positive electrode and the negative electrode; and
a non-aqueous electrolytic solution,
wherein in the electrode group, an area the positive electrode and the negative electrode face each other is 250 cm$^2$ or more and 350 cm$^2$ or less,
the positive electrode includes a positive electrode mixture including manganese dioxide and a boron compound,
the negative electrode includes lithium metal or a lithium alloy,
the non-aqueous electrolytic solution includes ethylene carbonate,
a content of the boron compound in the positive electrode is 0.5 parts by mass or more and 2 parts by mass or less in terms of boron with respect to 100 parts by mass of the positive electrode mixture, and
a content of the ethylene carbonate in the non-aqueous electrolytic solution is 1 part by mass or more and 10 parts by mass or less with respect to 100 parts by mass of the manganese dioxide included in the positive electrode.
2. The lithium primary cell according to claim 1, wherein the boron compound includes a boron atom and an oxygen atom.
3. The lithium primary cell according to claim 1, wherein the boron compound includes at least one selected from the group consisting of H$_3$BO$_3$, B$_2$O$_3$, HBO$_2$, H$_4$B$_2$O$_4$, Li$_3$BO$_3$, LiBO$_2$ and Li$_4$B$_2$O$_4$.
4. A smart meter comprising:
a gas meter;
a communication device; and
the lithium primary cell according to claim 1 for supplying the gas meter and the communication device electric power.
5. A lithium primary cell comprising:
an electrode group including a positive electrode, a negative electrode, and a separator, the positive electrode and the negative electrode being wound with the separator interposed between the positive electrode and the negative electrode; and
a non-aqueous electrolytic solution,
wherein in the electrode group, an area the positive electrode and the negative electrode face each other is 250 cm$^2$ or more and 350 cm$^2$ or less,
the positive electrode includes a positive electrode mixture including manganese dioxide and a boron compound,
the negative electrode includes lithium metal or a lithium alloy,
the non-aqueous electrolytic solution includes ethylene carbonate,
a mass ratio B/Mn of boron (B) included in the boron compound present in the positive electrode to manganese (Mn) included in the manganese dioxide present in the positive electrode is 0.009 or more and 0.036 or less, and
a content of the ethylene carbonate in the non-aqueous electrolytic solution is 1 part by mass or more and 10 parts by mass or less with respect to 100 parts by mass of the manganese dioxide included in the positive electrode.

6. A smart meter comprising:
a gas meter;
a communication device; and
the lithium primary cell according to claim 5 for supplying the gas meter and the communication device electric power.

* * * * *